US012774678B2

(12) United States Patent
D'Arienzo

(10) Patent No.: US 12,774,678 B2
(45) Date of Patent: Oct. 27, 2026

(54) ENERGY CONVERSION SYSTEM INCLUDING MOVING MAGNETS

(71) Applicant: D.D. INNOVATION SRL, Monopoli (IT)

(72) Inventor: Giovanni D'Arienzo, Monopoli (IT)

(73) Assignee: D.D. Innovation SRL, Monopoli (IT)

( * ) Notice: Subject to any disclaimer, the term of this patent is extended or adjusted under 35 U.S.C. 154(b) by 351 days.

(21) Appl. No.: 18/703,874

(22) PCT Filed: Oct. 18, 2022

(86) PCT No.: PCT/IB2022/059974
§ 371 (c)(1),
(2) Date: Apr. 23, 2024

(87) PCT Pub. No.: WO2023/073501
PCT Pub. Date: May 4, 2023

(65) Prior Publication Data

US 2026/0153052 A1 Jun. 4, 2026

(30) Foreign Application Priority Data

Oct. 28, 2021 (IT) ........................ 102021000027638

(51) Int. Cl.
*F02C 6/16* (2006.01)
*H02K 35/02* (2006.01)

(52) U.S. Cl.
CPC ............... *F02C 6/16* (2013.01); *H02K 35/02* (2013.01); *F05D 2220/77* (2013.01); *F05D 2260/42* (2013.01)

(58) Field of Classification Search
CPC ....... F02C 6/16; H02K 35/02; F05D 2220/77; F05D 2260/42
See application file for complete search history.

(56) References Cited

U.S. PATENT DOCUMENTS

| | | | | |
|---|---|---|---|---|
| 3,988,897 | A | 11/1976 | Strub | |
| 4,435,663 | A * | 3/1984 | Gambino | H10N 15/20 310/306 |

(Continued)

FOREIGN PATENT DOCUMENTS

| | | | |
|---|---|---|---|
| DE | 102008048638 | A1 | 3/2010 |
| GB | 1005922 | A | 9/1965 |

(Continued)

OTHER PUBLICATIONS

International Search Report issued on Jan. 4, 2023, in corresponding International Application No. PCT/IB2022/059974; 2 pages.

*Primary Examiner* — Hoang M Nguyen
(74) *Attorney, Agent, or Firm* — Maier & Maier, PLLC

(57) ABSTRACT

An energy conversion system including moving magnets, having a first tank, a combustion chamber, a gas turbine and a compressor. The energy conversion system also has a second tank and an electromotive force generator, the latter being connected at a first end to the second tank and at a second end to the first tank, and comprising a first solenoid, a second solenoid, a first valve, a second valve, a third valve, a fourth valve, a fifth valve, a sixth valve, a seventh valve, an eighth valve, a first magnet and a second magnet. The first magnet is able to slide between two ends of the first solenoid, while the second magnet is able to slide between two ends of the second solenoid.

9 Claims, 2 Drawing Sheets

(56) References Cited

U.S. PATENT DOCUMENTS

| | | | | |
|---|---|---|---|---|
| 2009/0322098 | A1* | 12/2009 | Cohen | B60L 50/62 290/1 A |
| 2012/0249061 | A1* | 10/2012 | Watanabe | B60W 20/11 320/107 |
| 2016/0177822 | A1* | 6/2016 | Howes | F02C 6/16 60/785 |
| 2017/0145892 | A1 | 5/2017 | Peck, Jr. et al. | |
| 2020/0099322 | A1* | 3/2020 | Smith | F02C 9/56 |
| 2020/0309026 | A1* | 10/2020 | D'Arienzo | F24H 6/00 |

FOREIGN PATENT DOCUMENTS

| | | | |
|---|---|---|---|
| WO | 2006127500 | A2 | 11/2006 |
| WO | 2015019096 | A1 | 2/2015 |

* cited by examiner

ENERGY CONVERSION SYSTEM INCLUDING MOVING MAGNETS

TECHNICAL FIELD

The present embodiments relate to an energy conversion system including moving magnets.

In particular, the present embodiments relate to an energy conversion system including moving magnets, comprising a gas turbine and an alternative configuration of the components known in the state of the art of turbogas plants for the production of electricity.

BACKGROUND

As is known, in turbogas power plants, i.e., industrial plants designed to generate electricity by using a turbocharged internal combustion engine powered by gas or diesel, a compressor injects into an air combustion chamber to facilitate the combustion of methane gas or diesel, which generates high temperature thermal energy. The heat causes the expansion of the gas turbine, the consequent conversion of the thermal energy into mechanical energy, and the further conversion of the same mechanical energy into electrical energy through, for example, an alternator coupled to the turbine.

On the front of small-scale electricity production, conversely, for example in the field of electrical mobility, there is a need to design efficient and innovative solutions with a reduced environmental impact.

Various energy conversion systems, aimed at producing electrical energy, are currently known.

The patent application WO2006127500A2, for example, describes an electrical power generator based on an array of prying magnets, based on the arrangement of such elements in at least two spaced linear or circular arrays. Each magnet in one array interacts with a corresponding magnet in the other array, at a gap between the two magnets. The magnetic flux through the gap is increased by the presence of adjacent magnets in each array, having alternated magnetic orientation. The power generator comprises a carrier device sized and arranged to fit inside the cavity, in proximity to second exposed ends of the magnets, with said carrier carrying a solenoid so that relative movement, between said solenoid and the magnet, terminates substantially in a direction orthogonal to the magnetic axes, inducing an electrical current in the solenoid itself.

Again, the text of U.S. Patent Application US2017145892A1 relates to a gas turbine engine, with a chamber for combustion of a mixture of fuel and air, which generates an axial air flow. The turbo engine further comprises a hot section calendar for directing air flow through the engine assembly. The calendar may include an inner surface and an outer surface, opposite to the first. The turbo engine can further include a set of thermoelectric generators, or TEGS, that are thermally coupled to the external surface of the calendar. Each thermoelectric generator generates an electrical current based on a temperature differential through each TEG. The latter may include different materials that are used in differentiated heat zones along the calendar, between the combustion chamber and an engine exhaust terminal.

Still, the patent application U.S. Pat. No. 3,988,897A discloses an apparatus for storing energy produced in an electrical power-supply network and for re-utilizing the stored energy during peak loads of said network. The apparatus comprises a compressor group including at least two multistage turbo-compressors connected in series, a compressed-air storage chamber for receiving compressed air from said compressor group, an electrical machine connected to said compressor group and to said network to function as a motor for driving said compressor group to deliver compressed air to said storage chamber. A gas turbine selectively coupled to the electrical machine and to the storage chamber, for driving said electrical machine as a generator during a discharge of air from the storage chamber to supply electrical energy to the network, a cooler connected in series between the two turbo-compressors for cooling a flow of compressed air therebetween, a first conduit connected to an output of the lowest-pressure turbo-compressor of said compressor group and to said cooler to deliver compressed air thereto, are also provided. In addition, the apparatus comprises a second conduit connected between the cooler and an input of the lowest-pressure turbo-compressor, to deliver the air pumped from the output of the lowest-pressure turbo-compressor to said input thereof.

The patent application GB1005922A cites a generating system comprising, in combination, a free piston engine having a power cylinder with a fuel injector and reciprocally movable pistons arranged opposite sides of the fuel injector and at each end of the power cylinder, and two linearly reciprocating generators. Each of the generators has a reciprocally movable armature, while one of the pistons and one of the armatures are connected with each other directly, respectively.

Finally, German patent application DE102008048638A1 cites an electric generator operating with a pressurized working fluid, comprising a circular chamber in which a piston flows and provided with an inlet opening and an outlet opening. The piston is supported in the chamber and is rotatable about a midpoint of a ring along a circular path, and at the said ring the generator includes a solenoid. The piston carries an electromagnet along the circular path, with the electromagnet moved on the solenoid so that an electrical voltage is induced in the same solenoid. A movable sealant is disposed between the inlet and outlet openings, and sealingly closes the piston chamber between said inlet and outlet openings.

However, energy conversion systems suitable for the production of electricity such as those described suffer from some limitations, for example, in the case of use of a gas turbine, they require that the same turbine is coupled to a current generator capable of working at the turbine rotation speeds, or to a speed reducer that allows it to be coupled to generators of the standard number of turns. For these reasons, systems using turbogenerators are often preferred to systems equipped with internal combustion engines coupled to standard generators.

A further limitation of the known systems is represented by the reduced flexibility in generating electrical powers lower than the nominal ones of the aforementioned systems.

SUMMARY

The object of the present invention is to provide an energy conversion system including moving magnets that is capable of producing electrical energy by combining the efficiency of an electrical generator coupled to a turbine and the flexibility of a generator coupled to an internal combustion engine, thus having characteristics that exceed the limits that still affect the systems known for the production of electrical energy.

Another object of the present invention is to provide an energy conversion system including moving magnets that allows to maintain the optimal efficiency of a gas turbine included in the system in question.

Finally, a further object of the present invention is to provide an energy conversion system including moving magnets that provides for the use of a reduced number of moving components.

According to the present invention, an energy conversion system including moving magnets is made.

BRIEF DESCRIPTION OF THE DRAWINGS

For a better understanding of the present invention, a preferred embodiment is now described, by way of non-limiting example only, with reference to the accompanying drawings, in which.

DETAILED DESCRIPTION

Figure 1:
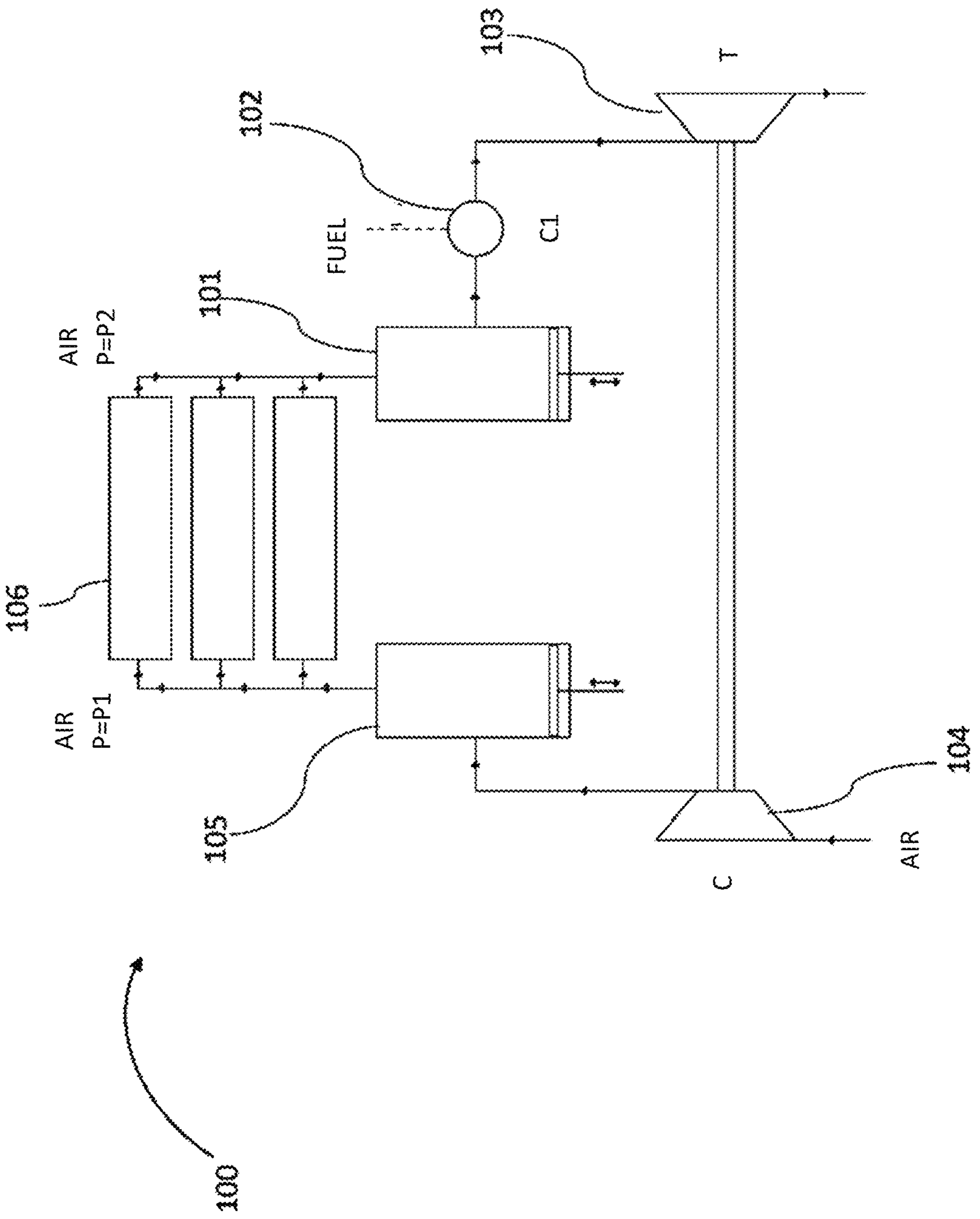
FIG. 1 shows an explanatory block diagram of the architecture of an energy conversion system including moving magnets, according to the invention.

With reference to such figures and, in particular, to FIG. 1, an energy conversion system including moving magnets is shown, according to the invention.

In particular, the energy conversion system 100 including moving magnets comprises:

- a first tank 101 able to store air at a P2 pressure, with said P2 pressure being higher than the atmospheric pressure;
- a combustion chamber 102, connected to the first tank 101, able to perform the combustion of a fuel and air at P2 pressure, as a result of which air at a T3 temperature emerges from the aforementioned combustion chamber 102;
- a gas turbine 103, connected to the combustion chamber 102, receiving air at the T3 temperature;
- a compressor 104, connected to the gas turbine 103, able to take air from the external environment and to bring said air, by means of mechanical energy produced by the gas turbine 103, to a P1 pressure P1, with this P1 pressure higher than the P2 pressure;
- a second tank 105, connected to the compressor 104, able to store air at P1 pressure produced by said compressor 104.

According to an aspect of the invention, the energy conversion system 100 also comprises at least one electromotive force generator 106, connected at a first end to the second tank 105 and at a second end, opposite to the first end, to the first tank 101.

Figure 2:
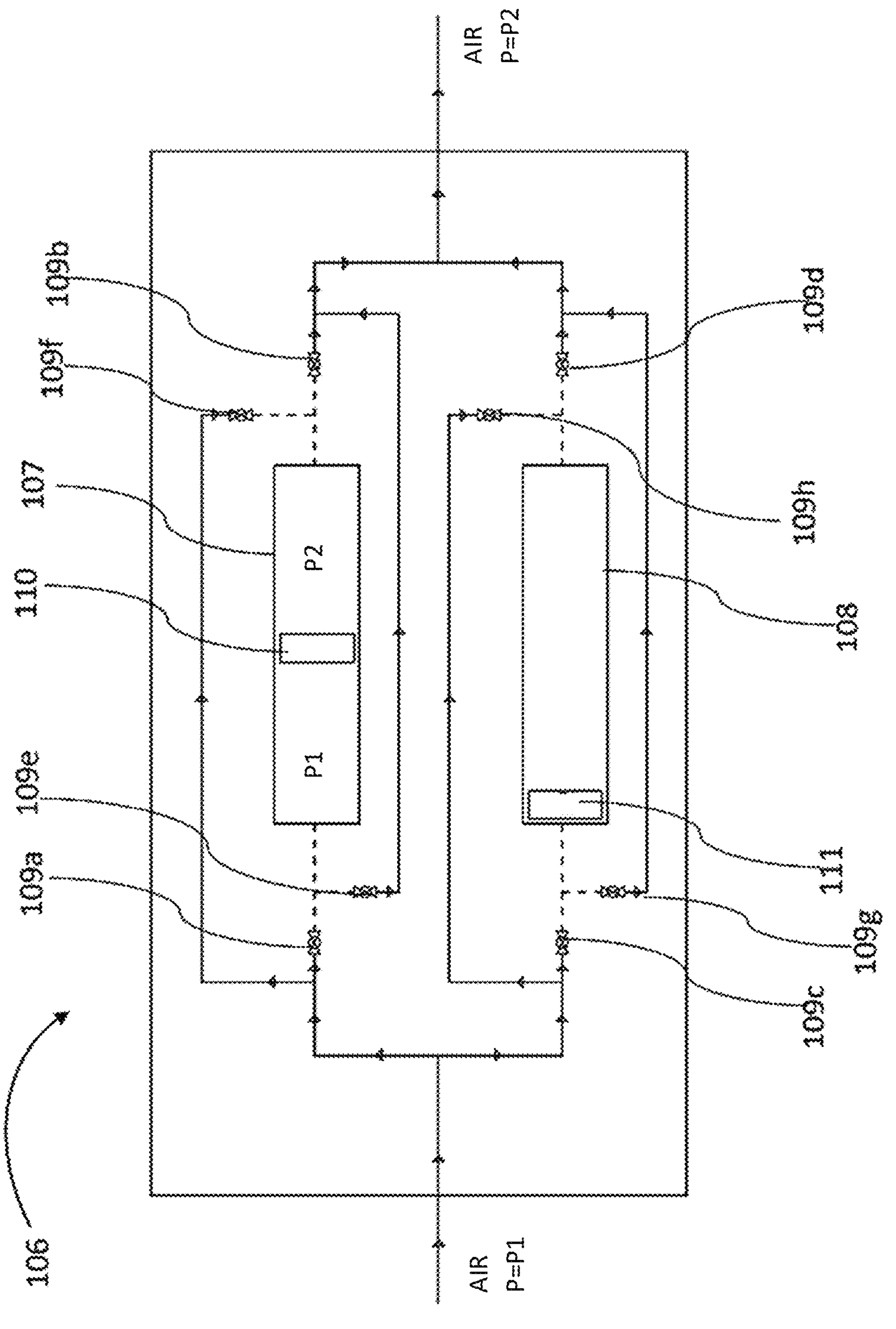
FIG. 2 shows an explanatory block diagram of the architecture of a component of the energy conversion system including moving magnets, according to the invention.

According to an aspect of the invention, said electromotive force generator 106, better visible in one of its schematizations in FIG. 2, comprises in turn:

- a first solenoid 107;
- a second solenoid 108;
- a plurality of valves;
- a first magnet 110 positioned within the first solenoid 107;
- a second magnet 111 positioned within the second solenoid 108.

According to an aspect of the invention, the plurality of valves comprises a first valve 109*a* interposed between the second tank 105 and a first end of the first solenoid 107, a second valve 109*b* interposed between a second end of the first solenoid 107 and the first tank 101, a third valve 109*c* interposed between the second tank 105 and a first end of the second solenoid 108, and a fourth valve 109*d* interposed between a second end of the second solenoid 108 and the first tank 101.

According to an aspect of the invention, the first magnet 110 is able to slide between the first end and the second end of the first solenoid 107 by means of a pressure gradient generated by the opening of the first valve 109*a* and the second valve 109*b*, and between the second end and the first end of the first solenoid 107 by means of a further pressure gradient generated by the opening of a fifth valve 109*e*, interposed between the first valve 109*a* and the first tank 101, and a sixth valve 109*f*, interposed between the second tank 105 and the second valve 109*b*.

According to another aspect of the invention, the second magnet 111 is able to slide between the first end and the second end of the second solenoid 108 by means of a pressure gradient generated by the opening of the third valve 109*c* and the fourth valve 109*d*, and between the second end and the first end of the second solenoid 108 by means of a further pressure gradient generated by the opening of a seventh valve 109*g*, interposed between the third valve 109*c* and the first tank 101, and an eighth valve 109*h*, interposed between the second tank 105 and the fourth valve 109*d*.

According to another aspect of the invention, the electromotive force generated by the electromotive force generator 106 consists of the sum of a first electromotive force measured between the two ends of the first solenoid 107, and a second electromotive force measured between the two ends of the second solenoid 108.

According to another aspect of the invention, the first electromotive force and the second electromotive force respectively depend, as will be detailed below, on the respective sliding speeds of the first magnet 110 within the first solenoid 107 and the second magnet 111 within the second solenoid 108.

According to an aspect of the invention, the electromotive force generator 106 comprises a diode circuit configured to straighten negative half-waves relating to the first electromotive force measured between the two ends of the first solenoid 107 and the second electromotive force measured between the two ends of the second solenoid 108.

According to another aspect of the invention, the first magnet 110 and the second magnet 111 have a cylindrical shape.

According to an aspect of the invention, the first solenoid 107 and the second solenoid 108 comprise guides configured for the alternate movement of the first magnet 110 between the first and second ends of said first solenoid 107, and of the second magnet 111 between the first and second ends of said second solenoid 108.

According to an aspect of the invention, the energy conversion system 100 preferably comprises an inverter connected in series to the electromotive force generator 106, downstream of the latter, configured to stabilize the waveform produced by the same electromotive force generator 106.

According to an aspect of the invention, the first tank 101 and the second tank 105 comprise respective pistons, able to modify respective volumes useful for storing air at different P2 and P1 pressures.

According to another aspect of the invention, the energy conversion system 100 comprises a battery pack able to store a fraction of electrical energy produced by said energy conversion system.

Going into more detail into the elements described, in use, the energy conversion system 100 provides, as mentioned, the first tank 101 containing air at a P2 pressure higher than the atmospheric pressure, air that is conveyed to be used as an oxidant in the combustion chamber 102, where by helping to burn the fuel the temperature is raised, up to, for example, the T3 temperature. The aforementioned air at T3 temperature subsequently enters the gas turbine 103 where, expanding, it generates mechanical power. The entire mechanical power is then used by the compressor 104 that draws air from the outside, bringing it to a P1 pressure, higher than the P2 pressure, which is thus introduced into the second tank 105.

It should be noted, according to an aspect of the invention, that the first tank 101 and the second tank 105, at the time of initialization of the energy conversion system 100, and only at that time, are partially preloaded. This operation is carried out either by charging them with air, from the outside, at the respective operating P2 and P1 pressures, or by acting, again from the outside, on the compressor 104, putting it into motion or, again, causing the magnets 110 and 111 to move, imparting a respective electrical current to the first solenoid 107 and the second solenoid 108.

The air at the P1 pressure, from the second tank 105, is introduced into the electromotive force generator 106, preferably in greater number than one and, if necessary, connected in parallel, as shown in FIG. 1, or in series, respectively in case of need of an electrical current or a higher electromotive force.

Each electromotive force generator 106 consists, as described above, of the pair of solenoids 107, 108, cables, within which are placed, respectively, the first magnet 110 and the second magnet 111, of cylindrical shape free to move. When the first inlet valve 109*a* and the second ejection valve 109*b* are opened, the pressure gradient is generated within the first solenoid 107. The first magnet 110 begins its travel between the first end and the second end of the first solenoid 107, due to the fact that on one side it is subject to the action of air at P1 pressure, and on the other side to the action of air at P2 pressure. Depending on the sliding speed of the first magnet 110, the first electromotive force is generated, and when the same magnet has reached its maximum speed the first valve 109*a* is closed, and the valves 109*c* and 109*d* are opened, upstream and downstream of the second solenoid 108 which, as seen for the first solenoid 107, cause the start of the sliding of the second magnet 111 due to a further pressure gradient. The first magnet 110 begins to slow down because, as the expansion continues, due to the closure of the first valve 109*a*, the pressure inside the first solenoid 107 tends to equalize to the P2 value.

Accordingly, while the first magnet 110 slows down, the second magnet 111 accelerates, making the sum of the speeds of the two magnets 110, 111, referable as $V_{max}$ and, proportionally, the sum of the first and second electromotive forces generated by the two solenoids 107, 108, almost constant. When the first magnet 110 reaches the end of the stroke, the second valve 109*b* is closed and the fifth and sixth valves 109*e*, 109*f* are opened, resulting in counter motion, from the second to the first end of the first solenoid 107 due to the pressure gradient, of the first magnet 110. A similar actuation logic is applied for reversing the motion of the second magnet 111 within the second solenoid 108, with the opening of the seventh valve 109*g* and the eighth valve 109*h* and the establishment of the further pressure gradient.

Advantageously according to the invention, the engagement of the diode circuit allows to rectify the negative half-waves generated by one of the two directions of the motion of the magnets 110, 111, and the subsequent intervention of the inverter downstream of the system allows to obtain the sinusoidal voltage useful, for example, for driving an electrical motor or for inputting it into the electrical grid.

Advantageously according to the invention, the energy conversion system 100 allows the production of a substantially constant electromotive force, like a solenoid of infinite length crossed by a magnet moved by a continuous expansion.

The expansion necessary to bring the pressure of all the air inside the solenoids 107, 108, from the value of P1 to the value of P2, from the moment of closing the inlet valves 109*a*, 109*c*, determines the internal volume and therefore the total length of the two solenoids included in each generator. The obtainable $V_{max}$ depends on the length of the solenoid and on the pressure gradient ΔP=(P1-P2), and therefore the electromotive force represented by the sum of the first and second electromotive forces generated by each pair of solenoids 107, 108 of each electromotive force generator 106.

Advantageously according to the invention, the presence of the guides inside the cavity of each solenoid, associated with the synchronization of openings and closures of the valves, allows the reciprocating movement of the magnets 110, 111 without the need for pushing elements such as connecting rods and cranks.

Advantageously according to the invention, the reduced number of moving mechanical parts, and therefore of inertial masses, makes the energy conversion system 100 immune from decreases in energy production due to friction.

According to a further embodiment of the invention, the eight valves 109*a*, 109*b*, 109*c*, 109*d*, 109*e*, 109*f*, 109*g*, 109*h* may be substituted by four three-way valves, each of them playing the role of a corresponding pair comprised within the eight valves of the first, preferred embodiment, previously described.

According to such a second embodiment of the invention, for example, a three-way valve would substitute the couple consisting of both 109*f* and 109*b* valves, another three-way valve would substitute the couple consisting of both 109*d* and 109*h* valves, and so on.

Still, in order to maintain the functionalities described about the preferred embodiment, each one of the four three-way valves has a closed position for every one of the three directions.

According to an aspect of the invention, as mentioned, the gas turbine 103 and the compressor 104 are dimensioned based on the ΔP and therefore on the electromotive force specified as the design data.

According to another aspect of the invention, the number of electromotive force generators 106 determines the air flow rate that the compressor 104 and the gas turbine 103 treat to satisfy the simultaneous operation of all the generators.

Advantageously according to the invention, the variable volume of the first and second tanks 101, 105, employed as specified for the storage of air, allows the latter to be stored in the second tank 105 when the operation of all the electromotive force generators 106 is not necessary, thanks to the piston of the same second tank 105 which increases the volume useful for the storage of excess air.

According to an aspect of the invention, in order to maintain a constant flow of combustion air, the first tank 101 is emptied and, therefore, its dimensions are reduced thanks to the actuation of the relative piston, in order to ensure that the pressure inside it remains equal to the P2 value. Next, when the second tank 105 is fully filled, the gas turbine 103 is shut down by storing the air in the first tank 101 that resumes filling.

Advantageously according to the invention, the flow difference between the amount of air entering the second tank 105 and the amount of air exiting the second tank 105 allows flexibility in the production of electrical energy while the gas turbine 103 continues to operate at the same speed, thanks to the air flow difference between the amount of air entering the first tank 101 and the amount of air exiting the same first tank 101. These differences in flow rates are, of course, the same but the opposite.

Furthermore, advantageously according to the invention, the presence of air at P2 pressure in the first tank 101 guarantees a fast ignition and commissioning of the gas turbine 103, since the air contained in the aforementioned tank is already in the thermodynamic conditions to proceed with the combustion and therefore with the realization of the conditions inlet to the turbine, without the need to initially rotate, for example by means of another engine, the same turbocharger. This ensures a quick start-up and achievement of the nominal rotation conditions in a very short time, making the turbocharger on and off inexpensive even if repeated several times, for example due to a reduced electricity production regime.

Advantageously according to the invention, the dependence of the electromotive force generated on the $V_{max}$, that is, on the ΔP pressure gradient and on the internal volume of the solenoids, allows to overcome the limits related to a generator to be coupled directly to a turbine or to an interposed gearbox, with simultaneous aggravation of mechanical pressure losses.

Therefore, the energy conversion system including moving magnets according to the invention allows an electrical energy production with a flexibility that the known turbine and generator systems do not guarantee, with a constant maintenance of the optimal efficiency of the turbine itself.

Furthermore, the energy conversion system including moving magnets according to the invention allows the optimal efficiency of the gas turbine employed in the plant to be kept constant.

A further advantage of the energy conversion system including moving magnets according to the invention is that it comprises a small number of moving mechanical parts, specifically the turbine, the compressor and the magnets; therefore, the friction losses are considerably contained, making the system more efficient than a generator coupled to an internal combustion engine.

Finally, the energy conversion system including moving magnets according to the invention allows to produce electricity, particularly for Small and medium energy requirements, for example for electrical mobility, combining the typical performances of a generator associated with a turbine and the flexibility of a generator coupled to an internal combustion engine.

It is finally clear that the energy conversion system including moving magnets, described and illustrated herein, may be subject to modifications and variations without departing from the protective scope of the present invention, as defined in the attached claims.

The invention claimed is:

1. An energy conversion system including moving magnets, comprising:

a first tank able to store air at a P2 pressure, said P2 pressure being higher than the atmospheric pressure;

a combustion chamber, connected to the first tank, able to perform the combustion of air at P2 pressure and a fuel, from said combustion chamber exiting, as a result of said combustion, air at a T3 temperature;

a gas turbine, connected to the combustion chamber, receiving air at T3 temperature;

a compressor, connected to the gas turbine, able to take air from the external environment and to bring said air, by means of mechanical energy produced by the gas turbine, to a P1 pressure, said P1 pressure being higher than P2 pressure;

a second tank, connected to the compressor, able to store air at P1 pressure produced by said compressor; and at least one electromotive force generator, connected at a first end to the second tank and at a second end, opposite to the first end, to the first tank;

the at least one electromotive force generator comprising:

a first solenoid;

a second solenoid;

a first valve interposed between the second tank and a first end of the first solenoid;

a second valve interposed between a second end of the first solenoid and the first tank;

a third valve interposed between the second tank and a first end of the second solenoid;

a fourth valve interposed between a second end of the second solenoid and the first tank);

a fifth valve interposed between the first valve and the first tank;

a sixth valve interposed between the second tank and the second valve;

a seventh valve interposed between the third valve and the first tank;

an eighth valve interposed between the second tank and the fourth valve;

a first magnet positioned inside the first solenoid; and a second magnet positioned inside the second solenoid.

2. The energy conversion system according to claim 1, wherein the first magnet is able to slide between the first end and the second end of the first solenoid by means of a pressure gradient generated by the opening of the first valve and of the second valve, and between the second end and the first end of the first solenoid by means of a further pressure gradient generated by the opening of the fifth valve and of the sixth valve, and wherein the second magnet is able to slide between the first end and the second end of the second solenoid by means of a pressure gradient generated by the opening of the third valve and of the fourth valve, and between the second end and the first end of the second solenoid by means of a further pressure gradient generated by the opening of the seventh valve (109*g*) and of the eighth valve.

3. The energy conversion system according to claim 1, wherein the electromotive force generated by the at least one electromotive force generator consists of the sum of a first electromotive force measured between the two ends of the first solenoid and of a second electromotive force measured between the two ends of the second solenoid, said first electromotive force and second electromotive force depending respectively on sliding speeds of the first magnet inside the first solenoid and of the second magnet inside the second solenoid.

4. The energy conversion system according to claim 3, wherein the at least one electromotive force generator comprises a diode circuit configured to rectify negative half-waves related to the first electromotive force measured between the two ends of the first solenoid, and to the second electromotive force measured between the two ends of the second solenoid.

5. The energy conversion system according to claim 1, wherein the first magnet and the second magnet have a cylindrical shape.

6. The energy conversion system according to claim 1, wherein the first solenoid and the second solenoid comprise guides configured for the alternate movement of the first magnet between the first end and the second end of said first solenoid, and of the second magnet between the first end and the second end of the second solenoid.

7. The energy conversion system according to claim 1, further comprising an inverter, connected in series to the at least one electromotive force generator, and configured to stabilize the waveform produced by said at least one electromotive force generator.

8. The energy conversion system according to claim 1, wherein the first tank and the second tank comprise pistons able to modify respective useful volumes of said first tank and second tank.

9. The energy conversion system according to claim 1, further comprising a battery pack able to store a fraction of electrical energy produced by said energy conversion system.

* * * * *